US008893081B2

(12) United States Patent
Payzer et al.

(10) Patent No.: US 8,893,081 B2
(45) Date of Patent: Nov. 18, 2014

(54) SELECTIVELY ENABLING RUNTIME EDITING OF AN APPLICATION

(75) Inventors: Gershom Payzer, Seattle, WA (US);
Jason W. Falk, Seattle, WA (US);
Bradford H. Lovering, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 12/975,398

(22) Filed: Dec. 22, 2010

(65) Prior Publication Data

US 2012/0167041 A1 Jun. 28, 2012

(51) Int. Cl.
G06F 9/44 (2006.01)
G06F 21/62 (2013.01)

(52) U.S. Cl.
CPC .............. G06F 8/38 (2013.01); G06F 21/6209 (2013.01)
USPC .......................... 717/111; 717/104; 717/113

(58) Field of Classification Search
None
See application file for complete search history.

(56) References Cited

U.S. PATENT DOCUMENTS

| 6,947,991 | B1 * | 9/2005 | Burton et al. ................. 709/227 |
| 7,043,529 | B1 * | 5/2006 | Simonoff ...................... 709/205 |
| 8,239,882 | B2 | 8/2012 | Dhanjal et al. |
| 8,302,014 | B2 | 10/2012 | Lezama Guadarrama et al. |
| 2004/0215719 | A1 | 10/2004 | Altshuler |
| 2006/0174199 | A1 | 8/2006 | Soltis et al. |
| 2008/0178122 | A1 | 7/2008 | Besecker |
| 2010/0107056 | A1 | 4/2010 | Underhill et al. |
| 2010/0153866 | A1 | 6/2010 | Sharoni |

FOREIGN PATENT DOCUMENTS

| CN | 101243439 A | 8/2008 |
| CN | 101866299 A | 10/2010 |

OTHER PUBLICATIONS

"Extending Runtime Editing Capabilities Using Oracle Composer", Retrieved at << http://download.oracle.com/docs/cd/E12839_01/webcenter.1111/e10148/jpsdg_page_editor_adv.htm#CHDEEGEE >>, 53 pp.
"Web Runtime (WRT) Quick Start", Retrieved at << http://developer.symbian.org/wiki/index.php/Web_Runtime_(WRT)_Quick_Start >>, Retrieved Date: Sep. 14, 2010, 7 pp.
Tisseghem, Patrick, "Customizing and Branding Web Content Management-Enabled SharePoint Sites (Part 2 of 3): Extending WCM", Retrieved at http://msdn.microsoft.com/en-us/library/aa830815(office.12).aspx >>, Oct. 2006, 15 pp.
"Web development tools", Retrieved at http://www.webdevout.net/articles/webdev-tools >>, Retrieved Date : Sep. 14, 2010, 7 pp.
"Enabling Runtime Editing of Pages Using Oracle Composer" from Oracle Fusion Middleware Developer's Guide for Oracle WebCenter, viewed Nov. 9, 2010, 46 pp.
Notice on the First Office Action received from the State Intellectual Property Office of the Peoples's Republic of China, for Application No. 201110433669.6, dated Mar. 4, 2014, with English translation, 14 pages.

* cited by examiner

*Primary Examiner* — Chuck Kendall
(74) *Attorney, Agent, or Firm* — Nicholas Chen; Kate Drakos; Micky Minhas

(57) ABSTRACT

A particular method includes receiving credentials during execution of an application at a computing device. The credentials are evaluated to determine whether a user associated with the credentials is authorized to edit the application while the application is being executed. Upon determining that the user is authorized, an editing control is enabled during the execution of the application. The editing control is associated with a graphical user interface (GUI) element of the application and is operable to update the GUI element during execution of the application.

20 Claims, 4 Drawing Sheets

SELECTIVELY ENABLING RUNTIME EDITING OF AN APPLICATION

BACKGROUND

Although the source code for a software application may be text-based, the software application may generate graphic elements during runtime. When developing such applications, it may be difficult to visualize how incremental changes to the source code will change the graphic elements. Some development environments may use a "split view" to simultaneously display source code and graphics. For example, half of a development interface may display source code while the other half of the interface previews the runtime interface (e.g., displays a preview of a web page of a web application). However, as design elements such as cascading style sheets (CSS) become complicated, the preview may not accurately reflect the interface. Moreover, since the preview may not be completely accurate, a software developer may need to context switch between the development environment and a browser to see what the application (e.g., web application) will look like.

Another approach is to use placeholder images that attempt to simulate the appearance of web pages. For example, an online form designer may use placeholder images. When a developer adds a text field into the form, the form designer may not actually add a text field capable of text input into the form. Instead, the form designer may add an image that is representative of a text field into the form. The accuracy of this approach may depend on the complexity of the web application. For example, as long as the developer uses conventional items for which the form designer has accurate placeholder images, the preview may be sufficiently accurate. However, if the developer attempts to use customized CSS or specialized widgets, the preview may no longer be accurate or useful. Thus, the user may be forced to context switch between a design-time tool, such as the form designer, and a runtime tool, such as a browser.

SUMMARY

Systems and methods of selectively enabling an ability to edit applications during runtime are disclosed. An application (e.g., a web application) may include an application runtime. For example, the application runtime may include a CSS layer, a hypertext markup language (HTML) layer, and a run mode layer. The application may also include an edit mode runtime extension layer that exists on top of the application runtime. For users that are authorized to perform runtime edits, the edit mode runtime extension may be enabled and such users may modify application elements from within the run mode. The modifications may automatically trigger updates to the underlying CSS and HTML files and may also result in visible changes at the run mode. Thus, a web application developer may edit a web application via a browser, while the web application is executing at the browser, without switching to a separate edit mode or to an integrated development environment (IDE).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
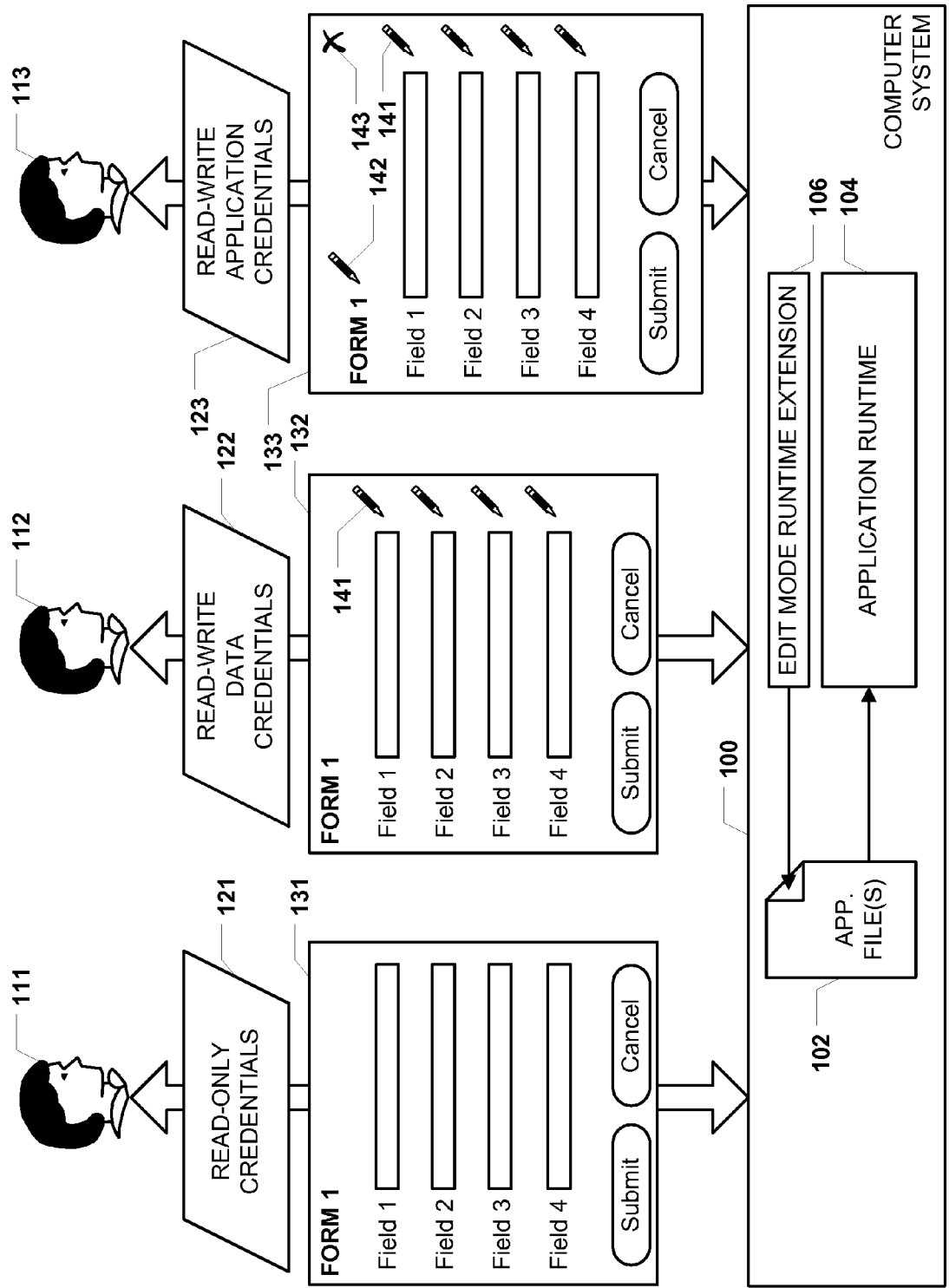
FIG. 1 is a diagram to illustrate a particular embodiment of a system operable to selectively enable runtime editing of an application.

The disclosed techniques may enable selective editing of an application while the application is being executed. For example, a web application may include an edit mode runtime extension layered over the application runtime. The edit mode runtime extension may be enabled or disabled for a user based on credentials provided by the user. When the user is authorized to make runtime edits to the application, the application may display editing controls for various graphical user interface (GUI) elements. The user may edit the GUI elements via the editing controls. Runtime edits may automatically be reflected in the application without the user having to recompile or restart the application. In addition, the runtime edits may cause modification of underlying application files (e.g., HTML files and CSS files).

In a particular embodiment, a computer-implemented method includes receiving credentials during execution of an application at a computing device. The method also includes evaluating the credentials to determine whether a user associated with the credentials is authorized to edit the application while the application is being executed. The method further includes, upon determining that the user is authorized, enabling an editing control during the execution of the application. The editing control is associated with a graphical user interface (GUI) element of the application and is operable to update the GUI element during execution of the application.

In another particular embodiment, a non-transitory computer-readable storage medium includes instructions that, when executed by a computer, cause the computer to receive credentials during execution of an application. The instructions are also executable to evaluate the credentials to determine whether a user associated with the credentials is authorized to edit the application while the application is being executed. The instructions are further executable to enable an editing control associated with a GUI element of the application upon determining that the user is authorized. The instructions are executable to modify one or more files of the application based on the input and to update the GUI element during the execution of the application to reflect the input.

In another particular embodiment, a computer system includes a processor and a memory storing instructions executable by the processor to receive credentials during execution of an application. The instructions are also executable to evaluate the credentials to determine whether a user associated with the credentials is authorized to edit the application while the application is being executed. The instructions are further executable to, upon determining that the user is authorized, enable an editing control associated with a GUI element of the application. The instructions are executable to receive input via the editing control and to modify one or more files of the application based on the editing input. The instructions are also executable to update the GUI element during the execution of the application to reflect the input.

FIG. 1 is a diagram to illustrate a particular embodiment of a system 100 operable to selectively enable runtime editing of an application. The application may include an application runtime 104 and an edit mode runtime extension 106. The application may also be associated with one or more application files 102. In a particular embodiment, the application is a web application and the computer system 100 is a personal computing device executing the web application (e.g., via a browser) or a computer server (e.g., a web server or an application server).

The application files 102 may include files that are used to build and execute the application. For example, the application files 102 may include hypertext markup language (HTML) files, cascading style sheets (CSS) files, extensible markup language (XML) files, source code files, data files, or any combination thereof.

The system 100 may selectively enable and disable editing controls at the application. For example, whether or not a particular editing control is enabled and displayed may depend on the identity of the user executing the application. To illustrate, editing controls may be selectively enabled and disabled for three users 111, 112, and 113. Each user 111-113 may be associated with different credentials (e.g., a user name, a password, or a certificate), and the system 100 may selectively enable and disable editing controls based on the credentials.

For example, the first user 111 may be associated with read-only credentials 121. Thus, the first user 111 may have a read-only permission level with respect to the application and may not be authorized to edit any part of the application while the application is executing. When a user with read-only permission executes the application, all editing controls at the application may be disabled. To illustrate, the first user 111 may provide the read-only credentials 121 to the system 100 (e.g., via an input device such as a keyboard or a mouse). The system 100 may evaluate the read-only credentials 121 and determine that the first user 111 is not authorized to edit the application while the application is executing. In response, the system 100 may disable the edit mode runtime extension 106 and provide a first GUI 131 to the first user 111 (e.g., by transmitting the first GUI 131 to a display device associated with the first user 111). For example, as illustrated in FIG. 1, the first GUI 131 may be a form that includes a plurality of GUI elements, including four text fields and two buttons. The first GUI may not include any editing controls for the GUI elements, since the first user 111 is not authorized to make runtime edits to the application.

As another example, the second user 112 may be associated with read-write data credentials 122. Thus, the second user 112 may have a read-write data permission level that authorizes the second user 112 to edit data of the application (but not to edit functionality of the application). When a user with read-write data permission executes the application, a subset of editing controls at the application may be enabled. To illustrate, the second user 112 may provide the read-write data credentials 122 to the system 100 (e.g., via an input device such as a keyboard or a mouse). The system 100 may evaluate the read-write data credentials 122 and determine that the second user 112 is authorized to edit data portions of the application while the application is executing. In response, the system 100 may enable the edit mode runtime extension 106 and provide a second GUI 132 to the second user 112. For example, as illustrated in FIG. 1, an editing control 141 (depicted as a pencil) may be enabled and displayed for data elements of the form, such as the four text fields. The second user 112 may use the editing control 141 for a text field to provide input that modifies the properties of the text field, such as layout properties (e.g., corresponding to CSS files) or behavior properties (e.g., corresponding to HTML files and web script code). For example, the layout properties for a GUI element may include a background color, a foreground color, a font, a font size, and a location of the GUI element. Behavior properties for a GUI element may include a data type, a minimum value, a maximum value, or a data validation rule. The second user 112 may change any or all of the layout properties and behavior properties of the text fields of the second GUI 132.

As yet another example, the third user 113 may be associated with read-write application credentials 123. Thus, the third user 113 may be authorized to edit any aspect of the application while the application is executing, including data and functionality of the application. When a user with read-write application permission executes the application, all editing controls at the application may be enabled. To illustrate, the third user 113 may provide the read-write application credentials 123 to the system 100 (e.g., via an input device such as a keyboard or a mouse). The system 100 may evaluate the read-write application credentials 123 and determine that the third user 113 is authorized to edit any part of the application while the application is executing. In response, the system 100 may enable the edit mode runtime extension 106 and provide a third GUI 133 to the third user 113. For example, as illustrated in FIG. 1, editing controls may be enabled and displayed for the text fields of the third GUI 133. Editing controls may also be displayed for the form itself, such as an editing control 142 to modify the form and a delete control 143 to delete the form. For example, the editing control 142 may enable the third user 113 to change layout properties (e.g., colors and fonts) of the form and behavior properties (e.g., data validation rules) of the form.

In a particular embodiment, the system 100 may automatically modify the underlying application files 102 based on input received via the editing controls 141-143. For example, source code may automatically be generated to implement the modifications. The system 100 may also automatically update the GUI elements corresponding to the editing controls 141-143. For example, the editing controls 141-143 may be operable to update the form, the text fields, and the application files 102 associated with the form and the text fields.

It will be appreciated that the system 100 of FIG. 1 may selectively enable runtime editing of an application and may enable runtime edits to be made and accurately reflected via a single mode (e.g., a run mode). Therefore, a developer may use the system 100 of FIG. 1 to edit a web application in run mode while the web application is executing, without context switching between the run mode and a separate edit mode. The system 100 of FIG. 1 may advantageously transform an application's runtime into an editing and development environment, and developers may create and update application features from within the runtime.

It should be noted that although the embodiment of FIG. 1 is described with reference to a web application and a form, this is for illustrative purposes only. The runtime editing techniques disclosed herein may be used with any type of application. For example, the disclosed systems and methods may also be used in a database application. Read-only users such as consumers or testers may not be authorized to edit any part of the application or the underlying database tables. Read-write data users may be able to edit the database tables that are used by the application. Read-write application users may be able to edit both the application as well as the underlying database tables.

Figure 2:
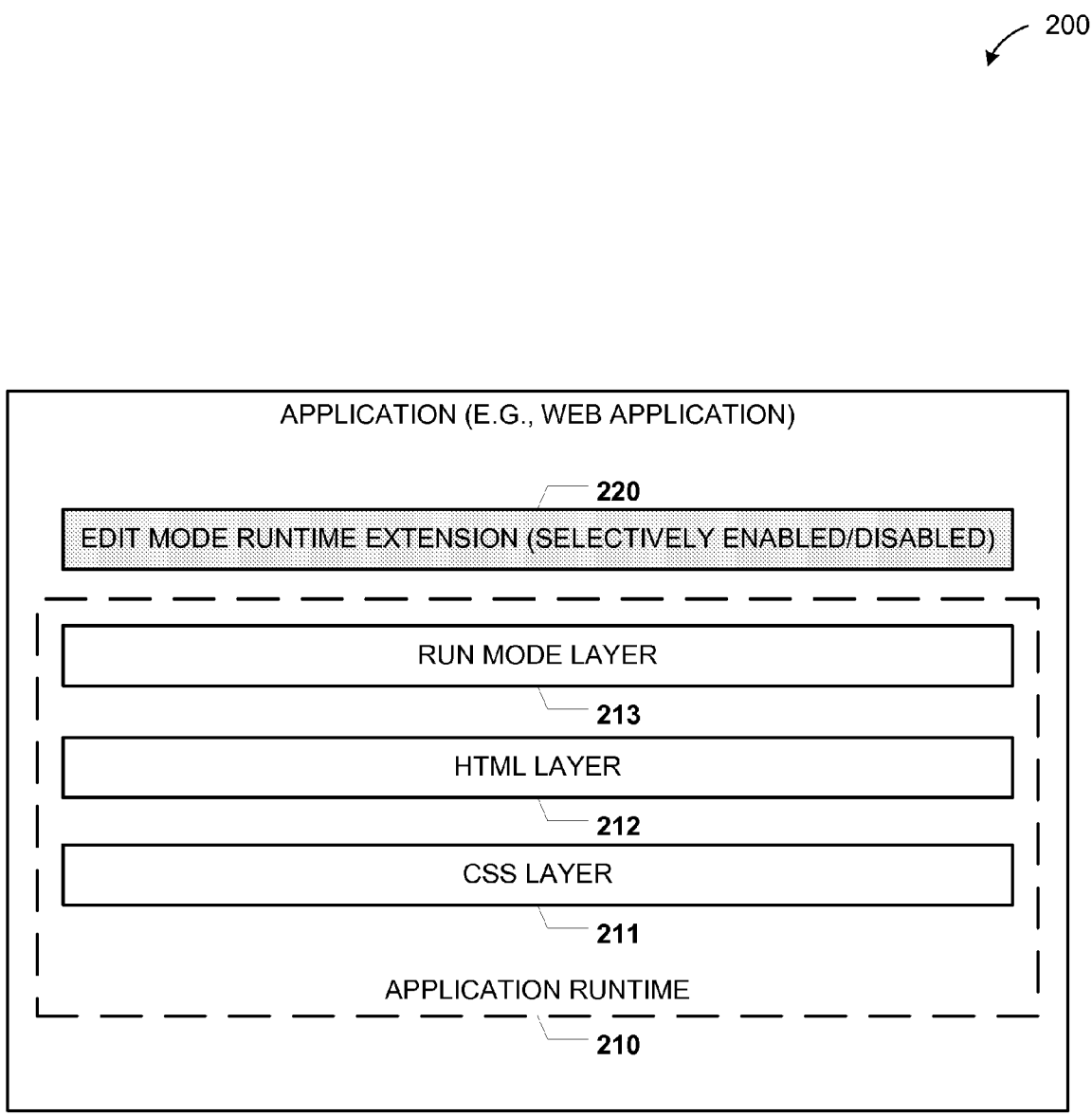
FIG. 2 is a diagram to illustrate a particular embodiment of an application that supports runtime editing.

FIG. 2 is a diagram to illustrate a particular embodiment of an application 200 that supports runtime editing. The application 200 may include an application runtime 210 and an edit mode runtime extension 220. In an illustrative embodiment, the application runtime 210 may be the application runtime 104 of FIG. 1 and the edit mode runtime extension 220 may be the edit mode runtime extension 106 of FIG. 1.

In a particular embodiment, the application runtime 210 includes one or more layers that include runtime code and data. For example, the application runtime 210 may include a CSS layer 211, an HTML layer, and a run mode layer 213. The edit mode runtime extension 220 may be considered as a layer that may be applied on top of the application runtime 210. As described with reference to the edit mode runtime extension 106 of FIG. 1, the edit mode runtime extension 220 may selectively be enabled and disabled. When the edit mode runtime extension 220 is enabled, the application 200 may execute the edit mode runtime extension 220 in conjunction with the run mode layer 213. The functionality of the edit mode runtime extension 220 (e.g., editing controls) may be available to users via the run mode layer 213 without context switching between the run mode layer 213 and a different mode (e.g., a developer edit mode).

It will be appreciated that the application 200 of FIG. 2 may separate CSS, HTML, runtime code, and edit mode code into distinct layers. For example, at the CSS level, editing controls (e.g., resize handles, selection boxes, properties, and menus) may be separated by a pseudo namespace. At the HTML level, the code for the editing controls may be fully encapsulated so that changes to the editing controls do not affect the runtime, though changes made via the editing controls do affect the runtime. For example, the editing controls may have a unique prefix or class name that enables the editing controls to be enabled and disabled without modifying any other aspect of the application. The application 200 of FIG. 2 may thus be preferable to existing "split-view" environments that combine runtime code and edit mode code.

Figure 3:
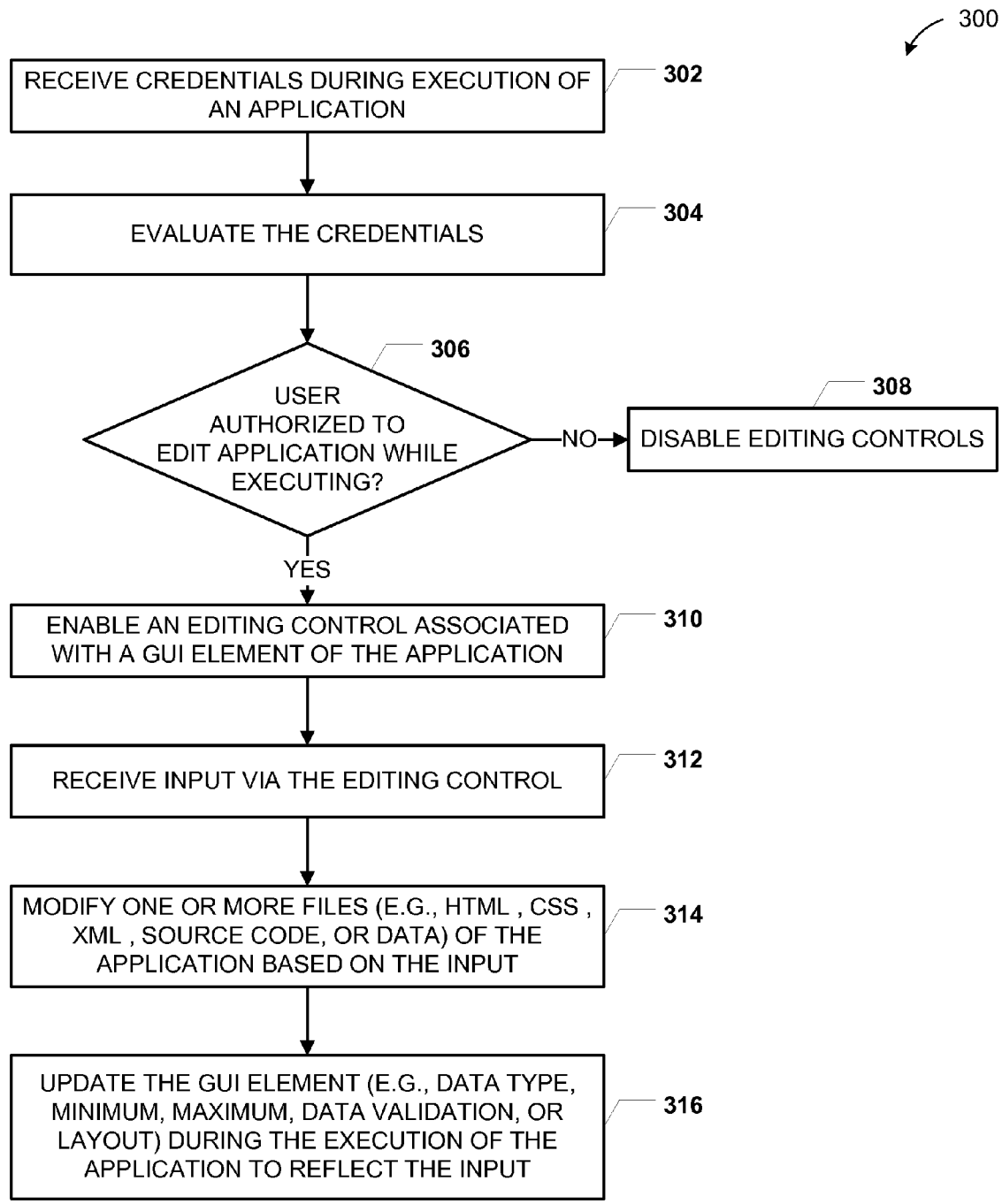
FIG. 3 is a diagram to illustrate a particular embodiment of a method of selectively enabling runtime editing of an application.

FIG. 3 is a diagram to illustrate a particular embodiment of a method 300 of selectively enabling runtime editing of an application. In an illustrative embodiment, the method 300 may be performed at the system 100 of FIG. 1.

The method 300 may include receiving credentials during execution of an application, at 302. For example, in FIG. 1, the read-only credentials 121, the read-write data credentials 122, or the read-write application credentials 123 may be received.

The method 300 may also include evaluating the credentials, at 304, to determine whether a user associated with the credentials is authorized to edit the application while the application is being executed, at 306. For example, in FIG. 1, the credentials 121, 122, or 123 may be evaluated.

When the user is not authorized to edit the application while the application is executing, the method 300 may disable editing controls at the application, at 308. For example, in FIG. 1, the edit mode runtime extension 106 may be disabled and the first GUI 131 may be provided to the first user 111.

When the user is authorized to edit the application while the application is executing, the method 300 may include enabling an editing control associated with a GUI element of the application, at 310. For example, in FIG. 1, the edit mode runtime extension 106 may be enabled and the second GUI 132 or the third GUI 133 may be provided to the second user 112 or the third user 113, respectively, where at least one of the editing controls 141-143 is enabled.

The method 300 may further include receiving input via the editing control, at 312. For example, in FIG. 1, input may be received via the text field editing control 141. The method 300 may include modifying one or more files of the application based on the input, at 314. The files may include HTML files, CSS files, XML files, source code files, data files, or any combination thereof. For example, in FIG. 1, the application files 102 may be modified. To illustrate, a CSS file may define a background of a text field to be white. The user may use the editing control to change the background of the text field to blue, and, in response, the definition in the CSS file may be modified.

The method 300 may also include updating the GUI element during the execution of the application to reflect the input, at 316. Updating the GUI element may include updating a data type, a minimum value, a maximum value, a data validation rule, or a layout of the GUI element. For example, in FIG. 1, the text field associated with the editing control 141 may be updated to reflect the input. To illustrate, the background of the text field may change from white to blue in the executing application.

Figure 4:
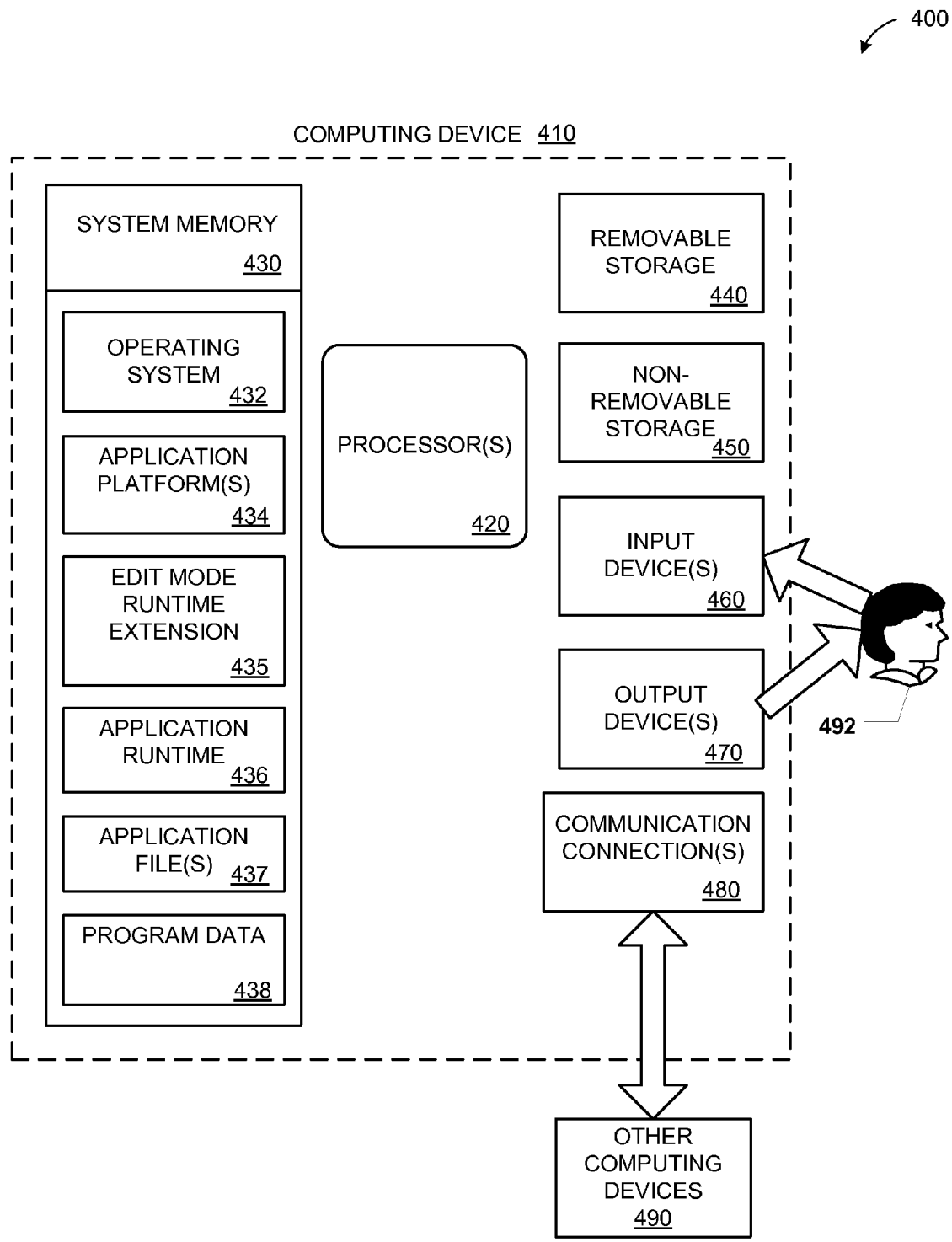
FIG. 4 is a block diagram of a computing environment including a computing device operable to support embodiments of computer-implemented methods, computer program products, and system components as illustrated in FIGS. 1-3.

FIG. 4 shows a block diagram of a computing environment 400 including a computing device 410 operable to support embodiments of computer-implemented methods, computer program products, and system components according to the present disclosure. For example, the computing device 410 or components thereof may include, implement, or be included as a component of the system 100 of FIG. 1.

The computing device 410 includes at least one processor 420 and a system memory 430. For example, the computing device 410 may be a desktop computer, a laptop computer, a tablet computer, a mobile phone, a server, or any other fixed or mobile computing device. Depending on the configuration and type of computing device, the system memory 430 may be volatile (such as random access memory or "RAM"), non-volatile (such as read-only memory or "ROM," flash memory, and similar memory devices that maintain stored data even when power is not provided), non-transitory, some combination of the three, or some other memory. The system memory 430 may include an operating system 432, one or more application platforms 434, one or more applications, and program data 438. For example, the system memory 430 may include portions of an executing application, such as an edit mode runtime extension 435 and an application runtime 436. The system memory 430 may also include one or more application files 437 associated with the application. In an illustrative embodiment, the edit mode runtime extension 435, the application runtime 436, and the application files 437 correspond to the edit mode runtime extension 106, the application runtime 104, and the application files 102 of FIG. 1, respectively.

The computing device 410 may also have additional features or functionality. For example, the computing device 410 may also include removable and/or non-removable additional data storage devices such as magnetic disks, optical disks, tape, and standard-sized or flash memory cards. Such additional storage is illustrated in FIG. 4 by removable storage 440 and non-removable storage 450. Computer storage media may include volatile and/or non-volatile storage and removable and/or non-removable media implemented in any technology for storage of information such as computer-readable instructions, data structures, program components or other data. The system memory 430, the removable storage 440, and the non-removable storage 450 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 410. Any such computer storage media may be part of the computing device 410.

The computing device 410 may also have input device(s) 460, such as a keyboard, mouse, pen, voice input device, touch input device, etc. connected via one or more input interfaces. Output device(s) 470, such as a display, speakers, printer, etc. may also be included and connected via one or more output interfaces. The input device(s) 460 and the output device(s) 470 may enable a user 492 to interact with applications executing at the computing device 410. For example, the output device(s) 470 may include a monitor connected to the computing device 410 via an output interface, where the output interface is configured to transmit GUI elements generated by the application runtime 436 to the monitor.

The computing device 410 also contains one or more communication connections 480 that allow the computing device 410 to communicate with other computing devices 490 over a wired or a wireless network. For example, the one or more communication connections 480 may represent an interface that communicates with the other computing devices 490 via a network.

It will be appreciated that not all of the components or devices illustrated in FIG. 4 or otherwise described in the previous paragraphs are necessary to support embodiments as herein described. For example, the removable storage 440 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
executing an application at a computing device, wherein executing the application includes display of one or more graphical user interface (GUI) elements based on one or more application files, and wherein the application is associated with a first user;
receiving credentials during execution of the application at the computing device, the credentials associated with the first user;
evaluating the credentials to determine whether the first user associated with the credentials is authorized to edit the application while the application is being executed; and
upon determining that the first user is authorized to edit the application, enabling an editing control during the execution of the application, wherein the editing control enables editing of at least one of the one or more GUI elements and wherein the editing control is operable to update at least one of the one or more application files, wherein updates to the at least one of the one or more application files correspond to changes to at least one of a layout property or a behavior property of at least one of the one or more GUI elements.

2. The method of claim 1, wherein the at least one of the one or more application files includes a CSS file and updates to the CSS file correspond to a change to the at least one layout property of the GUI element, wherein the at least one layout property includes one of a background color, a foreground color, a font, a font size, or a location of the GUI element.

3. The method of claim 1, further comprising automatically modifying the at least one of the one or more application files based on receiving input via the editing control.

4. The method of claim 3, wherein the one or more application files include a hypertext markup language (HTML)

file, a cascading style sheets (CSS) file, an extensible markup language (XML) file, a source code file, a data file, or any combination thereof.

5. The method of claim 1, further comprising automatically updating the at least one of the one or more GUI elements during the execution of the application to reflect input received via the editing control.

6. The method of claim 1, wherein the at least one of the one or more application files includes an HTML file and updates to the HTML file correspond to a change to the at least one behavior property of the GUI element, wherein the at least one behavior property includes one of a data type or a data validation rule.

7. The method of claim 5, wherein the application comprises a web application.

8. The method of claim 7, wherein the web application includes a form and wherein the at least one of the one or more GUI elements is a field of the form.

9. The method of claim 8, wherein automatically updating the at least one of the one or more GUI elements comprises updating a data type associated with the field, updating a minimum value associated with the field, updating a maximum value associated with the field, updating one or more data validation rules associated with the field, or any combination thereof.

10. The method of claim 1, wherein the application includes a runtime layer and an edit mode runtime extension.

11. The method of claim 10, wherein the runtime layer comprises a hypertext markup language (HTML) layer, a cascading style sheets (CSS) layer, and a run mode layer.

12. The method of claim 11, further comprising disabling the editing control when the first user is not authorized to edit the application while the application is being executed.

13. The method of claim 12, wherein disabling the editing control comprises disabling the edit mode runtime extension.

14. The method of claim 11, wherein the application is operable to execute the edit mode runtime extension in conjunction with execution of the run mode layer without context switching between the run mode layer and a different mode.

15. The method of claim 1, wherein the credentials include one of a username and password or a certificate, and wherein the computing device selectively enables one of a read-only permission level, a read-write data permission level, or a read-write application permission level based on the credentials.

16. The method of claim 15, further comprising:
disabling all editing controls at the application upon determining that the credentials are associated with the read-only permission level;
enabling a subset of editing controls at the application upon determining that the credentials are associated with the read-write data permission level; and
enabling all editing controls at the application upon determining that the credentials are associated with the read-write application permission level.

17. A computer-readable storage device comprising instructions that, when executed by a computer, cause the computer to:
execute an application at the computer, wherein execution of the application includes display of one or more graphical user interface (GUI) elements based on one or more application files, and wherein the application is associated with a first user;
receive credentials during execution of the application at the computer, the credentials associated with the first user;
evaluate the credentials to determine whether the first user associated with the credentials is authorized to edit the application while the application is being executed;
upon determining that the first user is authorized, enable an editing control that enables editing of at least one of the one or more GUI elements while the application is being executed;
receive input via the editing control;
modify at least one of the one or more application files based on the input, wherein modifying at least one of the one or more application files includes changing at least one of a layout property or a behavior property of the at least one of the one or more GUI elements; and
update at least one of the one or more GUI elements associated with the at least one of the one or more modified application files during the execution of the application to reflect the input.

18. The computer-readable storage device of claim 17, wherein the credentials comprise a user name, a password, a certificate, or any combination thereof.

19. A computer system, comprising:
a processor; and
a memory storing instructions executable by the processor to:
execute an application, wherein executing the application includes display of graphical user interface (GUI) elements based on application files, and wherein the application is associated with a first user;
receive credentials during execution of the application, the credentials associated with the first user;
evaluate the credentials to determine whether the first user is authorized to edit the application while the application is being executed;
upon determining that the first user is authorized, enable an editing control that enables editing of at least one of the GUI elements while the application is being executed;
receive input via the editing control;
modify at least one of the application files based on the input, wherein modifying at least one of the one or more application files includes changing at least one of a layout property or a behavior property of the at least one of the one or more GUI elements; and
update the at least one of the GUI elements during the execution of the application to reflect the input.

20. The computer system of claim 19, further comprising an output interface configured to transmit the at least one updated GUI element of the application to a display device.

* * * * *